United States Patent [19]

Eshghy

[11] 4,305,471
[45] Dec. 15, 1981

[54] SIMPLIFIED FASTENING TECHNIQUE USING THE LOGARITHMIC RATE METHOD

[75] Inventor: Siavash Eshghy, Pittsburgh, Pa.

[73] Assignee: Rockwell International Corporation, Pittsburgh, Pa.

[21] Appl. No.: 111,143

[22] Filed: Jan. 10, 1980

Related U.S. Application Data

[60] Continuation-in-part of Ser. No. 31,348, Apr. 19, 1979, Pat. No. 4,219,920, which is a division of Ser. No. 912,151, Jun. 2, 1978, Pat. No. 4,179,786, which is a continuation-in-part of Ser. No. 712,554, Aug. 9, 1976, abandoned.

[51] Int. Cl.³ .......................................... B25B 23/147
[52] U.S. Cl. ....................................... 173/12; 73/761; 73/862.23
[58] Field of Search .................. 173/12, 1, 6; 29/407, 29/240; 73/139, 761

[56] References Cited

U.S. PATENT DOCUMENTS

| | | | |
|---|---|---|---|
| 4,000,782 | 1/1977 | Finkelston | 173/12 |
| 4,104,779 | 8/1978 | Sigmund | 173/12 X |
| 4,163,310 | 8/1979 | Sigmund | 173/12 X |
| 4,244,245 | 1/1981 | Wallace et al. | 173/12 X |

Primary Examiner—Peter P. Nerbun

[57] ABSTRACT

A fastening tool, which is preferably portable, incorporates torque and angle sensors connected to an analog calculating circuit which determines, while tightening below the yield point of any component of the joint being tightened, a final shut off parameter which varies from joint to joint while tightening seriatim a plurality of substantially identical joints. The logarithimic rate method is used to determine the final shut off parameter. In accordance with one embodiment of the invention, a simplification occurs by the measurement of an angle interval occurring between two predetermined torque values. In accordance with another embodiment of the invention, a simplification occurs by measuring the torque value existing at a predetermined angle interval beyond a first predetermined torque level.

20 Claims, 5 Drawing Figures

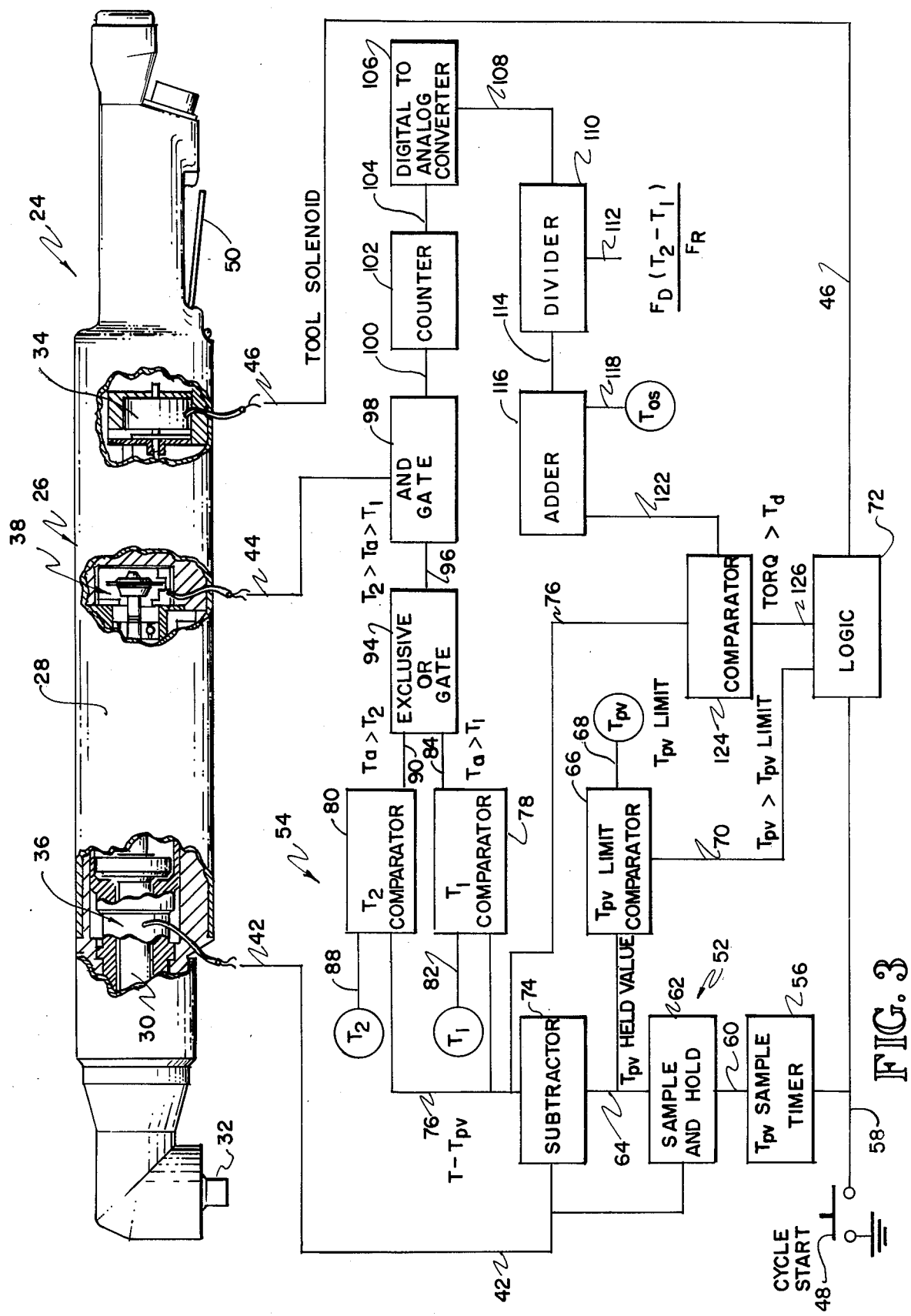

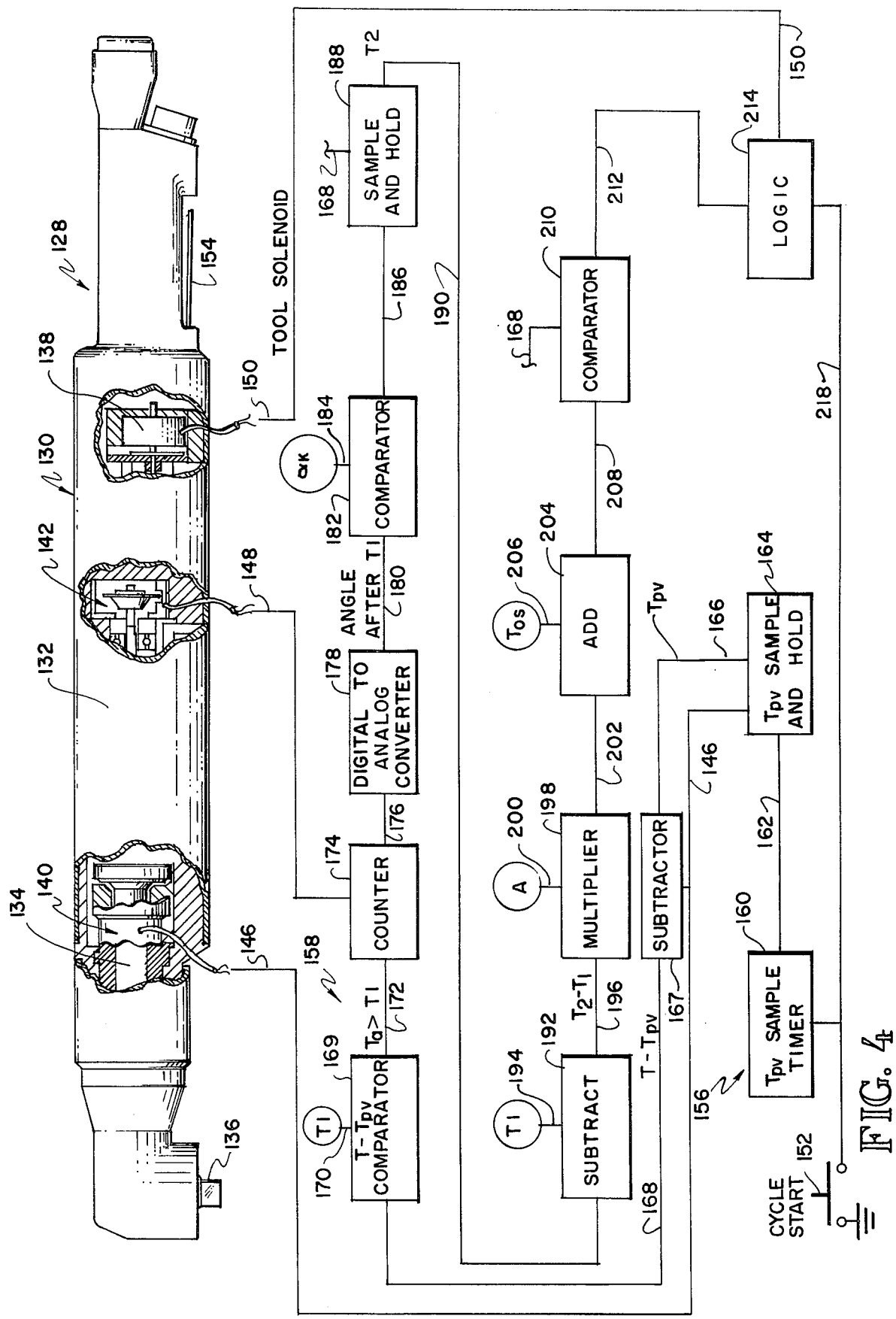

SIMPLIFIED FASTENING TECHNIQUE USING THE LOGARITHMIC RATE METHOD

This application is a continuation-in-part of application Ser. No. 31,348, filed Apr. 19, 1979, now U.S. Pat. No. 4,219,290 which is a division of application Ser. No. 912,151, filed June 2, 1978, now U.S. Pat. No. 4,179,786 which is in turn a continuation-in-part of application Ser. No. 712,554, filed Aug. 9, 1976, now abandoned.

This invention relates to a powered tool, preferably portable, for making up threaded fasteners. There has recently been introduced a new strategy or technique for tightening threaded fasteners which is known as the logarithmic rate method. This technique is disclosed more fully in United States application Ser. No. 912,151, filed June 2, 1978, the disclosure of which is incorporated herein by reference. Basically, this technique involves the analyzing of torque and angle signals generated during tightening of a threaded fastener below the yield point of any joint component that can be correlated with stress to determine a shut off parameter which is peculiar to the joint then being tightened.

In the course of designing a family of tools to carry out the logarithmic rate method, it has become desirable to provide a simplified technique which can, if desired, be incorporated in a portable tool, by which is meant that the data processor or calculation circuitry along with any necessary electrical power source may be borne by the operator either in a carrying case or in the tool itself.

One problem with designing a portable tool using the logarithmic rate method is that the orientation of the tool relative to the work can be changed by the operator during tightening of the fastener. If the operator should rotate the tool 10°, for example, during the course of tightening, any shut off parameter in terms of angle will necessarily be 10° off. Whether the joint has been tightened too little or too much depends on which direction, relative to tool rotation, the tool has been turned. Since a 10° error at the end of the tightening cycle produces a significant amount of tension in the fastener, angle measured shut off parameters are inappropriate for portable tools.

It will be apparent, upon the most superficial examination, that the technique disclosed in Application Ser. No. 912,151 is a very elaborate and sophisticated technique requiring the use of considerable computation capacity and extensive software. One requirement for any simplified strategy is that the bottom line result, i.e. tension scatter per standard deviation, should not be substantially increased. One of the surprising aspects of this invention is that tightening performance, i.e. tension scatter, compares quite favorably to the more elaborate logarithmic rate approach of the parent application and is substantially better than the torque control method and/or the turn-of-the-nut method. For example, a test conducted on a fairly hard joint showed that tension scatter in one sigma or one standard deviation with the technique of this invention was on the order of about 5% of the desired tension value. In the same group of fasteners tested, the tool exhibited a 30% scatter in one standard deviation of torque at constant tension. Accordingly, the torque control method would have experienced a tension scatter at constant torque for one standard deviation of about 30%. Experience indicates that the tension scatter for a turn-of-the-nut approach would be on the order of about 8% per standard deviation.

In one aspect, this invention contemplates the determination, during tightening, of the value of a tightening parameter which is sufficient to tighten each fastener pair to a final desired tension value, which parameter varies from one fastener pair to the next. Tightening of the fastener is then terminated in response to the variable value of the determined tightened parameter. This is accomplished by imparting threading input characteristics to the fastener by a powered tool and sensing the input characteristics to generate signals representative thereof. Means are provided which are responsive to the generated signals and to a ratio of the final desired tension value in the fastener and the tension rate of the fastener in order to determine the final shut off parameter. Means are provided for terminating operation of the tool in response to the final shut off parameter.

It is accordingly an object of this invention to provide an improved and simplified technique for implementing the logarithmic rate method of tightening threaded fasteners.

Other aspects, objects and advantages of this invention will become more fully apparent as this description proceeds.

IN THE DRAWINGS

FIG. 3 is a schematic view of a tightening system of this invention;

FIG. 4 is a schematic view, similar to FIG. 3, of another embodiment of the invention.

Figure 1:
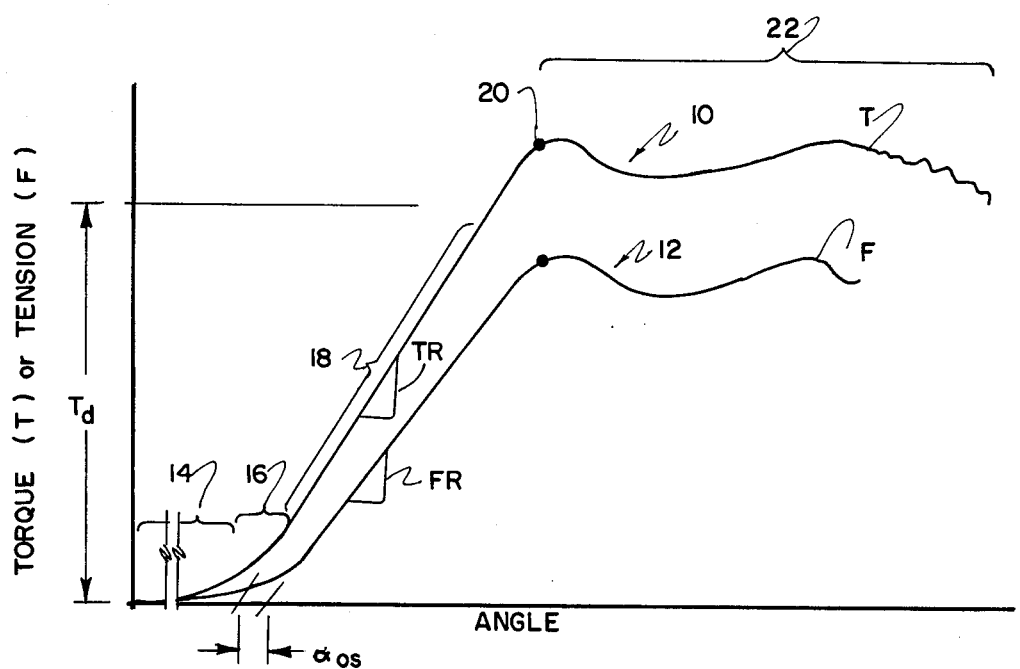
FIG. 1 is an illustration of typical torque-angle and tension-angle curves generated during the continuous tightening of a fastener pair far beyond its elastic limit.

Referring to FIG. 1, there is illustrated a typical torque-angle curve 10 and its corresponding tension-angle curve 12 which are developed during the continuous threading of a fastener pair to a point far beyond the elastic limit of the bolt, as may be measured and plotted in the laboratory with suitable equipment. In the torque curve 10, there is typically a free running region or period 14 where only a small torque is required to advance the nut and no appreciable bolt tension exists. This is followed by a region or period 16 of incipient clamp up where the joint parts are being brought toward engagement. This is followed by a period or region 18 where the torque rate TR is substantially constant. The torque rate TR and the tension rate FR in the region 18, may for complete accuracy, be divided into two regions where the torque rate and tension rate are constant but vary somewhat. The first simplification of this invention is to assume that the region 18 exhibits a single tension rate FR. It has been learned that this simplification does not add appreciably to scatter in the observed tension in tightened bolts.

The torque rate is essentially zero in the free running region 14. The amount of torque required to advance the nut in the region 14 depends on the thread-to-thread friction of the fastener pair and is accordingly a function of thread perfection, lubrication and the like. Those fasteners which require significant torque applications to advance the nut in the region 14 are called prevailing torque fasteners and the torque required to advance the fasteners in this region is known as prevailing torque $T_{pv}$.

The torque rate TR begins to increase substantially during the incipient clamp up region 16. The torque rate TR in the region 18 becomes substantially constant. Due to the existance of speed dependent losses such as lubricant squeeze film and microplasticity of the surface irregularities between the fastener parts and clamped pieces, a linear approximation of the torque curve 10 in the region 18 does not intersect the angle axis of the tension curve 12. An offset angle $\alpha_{os}$ exists which is proportional to such speed dependent losses. $\alpha_{os}$ describes the angular separation between the origin of the average torque slope TR and the origin of the average tension slope FR. Because of the torquespeed curve of the tool employed, it can be shown that $\alpha_{os}$ is torque rate dependent so that the offset torque $T_{os}$ is the joint property and $T_{os}$ is the product of the offset angle $\alpha_{os}$ and the torque rate TR. Because $T_{os}$ tends to be a rather small value, in the simplest application of this invention, $T_{os}$ can be disregarded.

The elastic limit 20 occurs at a point beyond which strain is not recoverable upon unloading and appears toward the upper end of the region 18 as is well known in classical mechanics. Somewhere in the region 22, the bolt begins to deform plastically rather than elastically. The exact commencement of the yield region 22 is difficult and, accordingly, the normal practical definition of the yield point is 0.1–0.2% strain which is somewhat arbitrary. The proportional limit occurs substantially below the yield point 20 and occurs where the stress/strain ratio is no longer constant.

In its simplest version of this invention, the only joint parameter which need be determined prior to production fastening operations is the joint tension rate FR. This is conveniently accomplished by selecting a reasonably large sample of the fasteners that ultimately will be tightened by the technique of this invention and empirically determining the value of tension rate FR in the laboratory. In order to provide somewhat greater accuracy, one may determine other factors, such as offset torque $T_{os}$, prevailing torque $T_{pv}$ and the amount of tool overrun, which may be expressed in either torque or angle units.

In application Ser. No. 912,151, the following equation is expressed:

$$\frac{dT/d\alpha}{T} = \frac{dF/d\alpha}{F} \quad (1)$$

It will be appreciated that $dT/d\alpha$ describes the torque rate of the fastener while $dF/d\alpha$ corresponds to tension rate. Rewriting equation reveals that:

$$T_D = (F_D/FR) \times TR \quad (2)$$

where $T_D$ is the torque value necessary to tighten the fastener to the desired tension value $F_D$, FR is the joint tension rate and TR is the torque rate. It will be appreciated that tension rate FR and final desired tension value $F_D$ are predetermined in the sense that values are obtained or selected long prior to the tightening of any particular fastener. Accordingly, the torque rate TR of the fastener being tightened is the only value that must be resolved during tightening to deduce the torque value $T_D$ needed to advance the fastener to its final desired tension value $F_D$.

Figure 2:
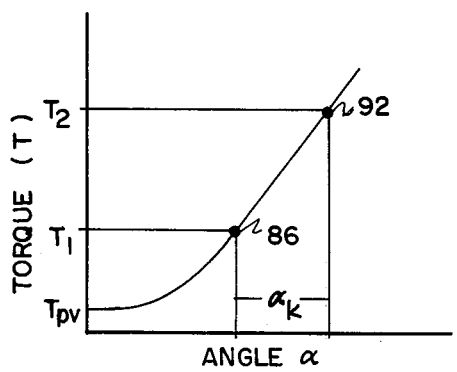
FIG. 2 is an enlarged illustration of a portion of the torque-angle curve of FIG. 1.

Another simplication of this invention is to utilize a two point measurement of torque rate rather than using a multiplicity of points and then smoothing the data, as by the use of least squares. Accordingly, $$T_D = \frac{F_D}{FR} \frac{T_2 - T_1}{\alpha_k} \quad (3)$$

where $T_1$ is a torque value sufficient to be on the substantially linear portion of the torque-angle curve 10 and $T_2$ is a torque value appearing at an angle spacing $\alpha_k$ from $T_1$, as suggested in FIG. 2.

There are several problems involved in the use of equation (3). Besides having to obtain or select values for the final desired tension value $F_D$ and tension rate FR, one must select a value for the first torque parameter $T_1$ which is sufficiently high to be on the linear portion of the torque-angle curve 10 and yet not so high that the final shut off command is given after the fastener reaches the yield point or passes the desired shut off point. The selected value of $T_1$ can be empirically determined in the laboratory while tightening the necessary fasteners to determine the tension rate FR. Although $T_1$ may vary somewhat, it is normally in the range of 20–50% of the average final torque value $T_{Da}$.

Another difficulty to resolve is to assure that $T_1$ and $T_2$ are spaced apart by an appropriate angular interval. If $T_1$ and $T_2$ are too close together, the value of the torque rate calculated from $(T_2-T_1)/\alpha_k$ would be unduly influenced by noise in the torque sensings that it would be unreliable or erractic. If $T_2$ and $T_1$ are too far apart and $T_1$ is sufficiently large, there is the possibility that the tool would have advanced the fastener beyond the desired tension value before the necessary computations were completed. In general, the spacing between $T_1$ and $T_2$ depends on the elastic properties of the joint, i.e. the joint tension rate. If the joint is quite hard, $T_1$ and $T_2$ should tend to be rather close together. If the joint is quite soft, $T_1$ and $T_2$ should tend to be rather far apart. Typically, the spacing between $T_2$ and $T_1$ is normally in the range of 5°–30°. The precise value of the spacing between $T_1$ and $T_2$ may be obtained in the laboratory during the determination of tension rate FR.

It will be appreciated that the hardware necessary to execute equation (3) may be simple or complex, as desired. Simplicity, of course, has its virtues and is one of the advantages afforded by a feature of this invention. Analysis of equation (3) reveals that there are three parameters which are measured during tightening, i.e. $T_1$, $T_2$ and $\alpha_k$. Rather than have an elaborate technique for storing all the necessary values, the approach of this invention is to predetermine two of the three parameters in the sense that two of the three parameters are selected well prior to the tightening of production fasteners. The two parameters may be, without the use of elaborate memory capability, either $T_1$ and $\alpha_k$, or $T_1$ and $T_2$. If one were to provide sufficient memory, $T_2$ and $\alpha_k$ could be predetermined.

Assuming that one desires to select $T_1$ and $T_2$, equation (3) reduces to:

$$T_D = \frac{F_D(T_2 - T_1)}{FR} \times \frac{1}{\alpha_k} \quad (4)$$

Since $F_D$, FR, $T_1$ and $T_2$ are constants for any particular joint, equation (6) reduces to:

$$T_D = C \times \alpha_k^{-1} \quad (5)$$

where C is $(F_D/FR)(T_2-T_1)$.

Assuming that one desires to select $T_1$ and $\alpha_k$, equation (3) reduces to:

$$T_D = \frac{F_D}{FR(\alpha_k)}(T_2 - T_1). \tag{6}$$

Since $F_D$, $FR$, $\alpha_k$ and $T_1$ are constants for any particular joint, equation (4) reduces to:

$$T_D = A(T_2 - B) \tag{7}$$

where A equals $F_D/(FR\alpha_k)$ and B is $T_1$.

It turns out that the analog circuitry for computations involving equations (5) and/or (7) are relatively simple.

As will be appreciated from the teachings in application Ser. No. 912,151, equation (3) does not correctly describe a practical joint since there are a number of torque components applied by the fastening tool which do not affect tension in the bolt. Specifically, the prevailing torque $T_{pv}$ exhibited by the fastener does not add to tension. In addition, there is another complicating factor. After the control circuitry signals the tool to stop, there is a lag between the instant the shut off signal is generated until the tool actually stops. This is known as overrun and may be measured in terms of angle as $\alpha_{or}$ or in terms of torque as $T_{or}$ which are interrelated by the expression:

$$T_{or} = TR\,\alpha_{or}. \tag{8}$$

In accordance with one feature of this invention, means are provided to accommodate for torque components which do not affect bolt tension and to accommodate overrun.

In order to refine the determinations made in accordance with equation (5), values for prevailing torque $T_{pv}$, offset torque $T_{os}$ and overrun, as measured in terms of torque, $T_{or}$ may be included in accordance with:

$$T_D = (C \times \alpha_k^{-1}) + T_{os} + T_{pv} - T_{or}. \tag{9}$$

It will be evident, of course, that any or all of these compensating torque values may be eliminated as desired.

Similarly, equation (7) may be refined as:

$$T_D = A(T_2-B) + T_{os}\,T_{pv} - T_{or}. \tag{10}$$

PREDETERMINING $T_1$ and $T_2$

Referring to FIG. 2, there is illustrated an initial portion of the torque-angle curve 10 which could be plotted from data generated during the tightening of a particular fastener. Since the values of $T_1$ and $T_2$ are predetermined, the only actual measuring requirement is the angle $\alpha_k$.

Referring to FIG. 3, there is illustrated a tightening system 24 in accordance with this invention. The system 24 includes a wrench 26 including a motor 28, an output drive shaft 30 and a driver bit 32. The drive shaft 30 is driven by the motor 28 to apply torque and impart rotation to a fastener engaged by the driver bit 32. The wrench 26 may be of any suitable type and, as is most common, is air driven with the flow of pressurized air being controlled by a suitable electrically energized motor or solenoid 34. It should be understood that the motor 32 may be driven in any suitable manner. The exact details of the wrench 26 are not necessary for a proper understanding of this invention and, accordingly, reference is made to the application of George D. Hall, Ser. No. 088,327, filed Oct. 25, 1979, entitled PORTABLE FASTENING TOOL WITH MANUAL TURN ON AND AUTOMATIC SHUT OFF, the disclosure of which is incorporated in by reference, for a more complete description thereof.

The wrench 12 is desirably of the portable type and includes a torque sensor or transducer 36 for generating a varying signal representative of the instantaneous torque being applied to the fastener. The torque transducer 24 may be of any suitable type such as disclosed in application Ser. No. 088,327. Mounted on the wrench 26 and preferably in association with the shaft of the motor 28 is an angle transducer or encoder 38 that produces signals representative of the incremental angular displacement or rotation of the fastener. As pointed out more fully in application Ser. No. 088,327, the torque and angle transducers 36, 38 may be of any suitable type that act to sense suitable input tightening characteristics of which torque and angle are exemplary. Other input tightening characteristics, such as motor load, tightening time and the like may be employed as desired. Typically, the output signal from the torque sensor 36 is analog while the output signal from the angle encoder 38 is digital and comprises a series of pulses, each of which designates a predetermined angle of rotation sensed by the encoder 38.

As shown in FIG. 3, the control circuit 40 is connected to the tool 26 by an electrical lead 42 extending to the torque sensor 36, an electrical lead 44 extending to the output of the angle encoder 38 and an electrical lead 46 extending to the solenoid 34 for stopping the tool 26 in response to the determinations made in the circuit 40. The circuit 40 includes a cycle start switch 48 which is preferably located inside the tool 26 in association with the operator's handle 50 as explained more fully in the aforementioned application of George D. Hall. The cycle start switch 48 also provides a reset feature so that the switch 48 opens at the end of a tightening cycle and the memory components of the circuit 40 are cleared.

As illustrated, the circuit 40 comprises two subcircuits, a circuit 52 for accommodating prevailing torque $T_{pv}$ and a main calculation circuit 54. The prevailing torque circuit 52 comprises a timer 56 connected to the cycle start switch 48 by a lead 58. At the end of a predetermined fairly short interval, the timer 56 delivers a signal through a lead 60 to a sample and hold component 62 which is connected to the torque lead 42. The value stored in the component 62 is representative of the prevailing torque $T_{pv}$ and is delivered to an output 64. It will be evident from FIG. 2 that the value of prevailing torque $T_{pv}$ does not long remain on the torque lead 42 and, consequently, the interval of the timer 56 must necessarily be relatively short. The maximum permissible length of the prevailing torque interval depends on the length of the bolt relative to the clamped pieces and the idle speed of the tool 26 as will be evident to those skilled in the art. Typically, the prevailing torque interval will be on the order of about 0.5 seconds.

Figure 5:
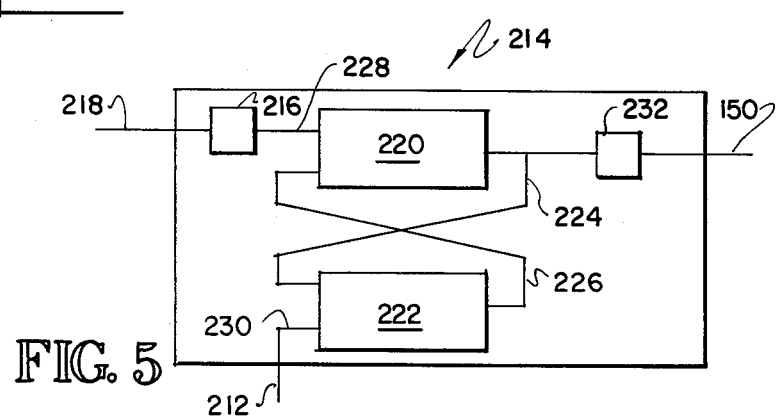
FIG. 5 is a schematic view of one of the components of FIGS. 3 and 4.

The prevailing torque circuit 52 also includes a prevailing torque limit comparator 66 having an input 68 carrying a signal representative of a maximum permissible value or limit for prevailing torque $T_{pv}$. An output 70 from the comparator 66 connects to a logic circuit 72 disclosed more fully in conjunction with FIG. 5. In the event the prevailing torque value stored in the component 62 is greater that the maximum permissible prevailing torque, the comparator 66 conducts and delivers a signal to the logic 72 which in turn delivers a signal through the solenoid lead 46 to turn the tool 26 off. Under this circumstance, it is apparent that something is amiss with the fastener, such as a cross-threaded nut or the like.

The main calculating circuit 54 comprises a subtractor 74 having one input connected to the torque lead and another input connected to the output of the sample and hold component 62. Accordingly, an analog signal is delivered from the subtractor 74 on an output 76 which is representative of an adjusted torque $T_a$ which is sensed torque T minus prevailing torque $T_{pv}$.

The subtractor output 76 is connected to first and second torque comparators 78, 80. The comparator 78 includes an input 82 carrying a signal representative of $T_1$. Accordingly, the comparator 78 delivers a signal along a lead 84 when the adjusted torque value exceeds $T_1$. Referring to FIG. 2, when the comparator 78 conducts, the tightening cycle is beyond the location 86. The comparator 80 also includes an input 88 which carries a signal representative of $T_2$ and includes an output 90. The comparator 80 conducts when the adjusted torque value $T_a$ is greater than $T_2$. It will be appreciated that the comparator 80 conducts when the tightening cycle reaches the location 92 illustrated in FIG. 2.

It might be questioned why prevailing torque $T_{pv}$ is deducted from running torque T prior to delivery of the running torque signal to the torque comparators 78, 80. Since prevailing torque $T_{pv}$ varies from joint to joint, deducting the prevailing torque signal from the running torque signal assures that the values of $T_1$ and $T_2$ are in a desired range of the linear portion of the torque-angle curve. For example, suppose that the batch of fasteners being tightened normally exhibits a rather high prevailing torque but that the particular fastener being tightened has little or no prevailing torque. In this situation, $T_2$ will not appear on the running torque signal until very late in the tightening cycle, perhaps beyond the desired shut off point. Similarly, if the batch of fasteners exhibits little or no prevailing torque and the particular fastener being tightened has an appreciable amount of prevailing torque, $T_1$ may appear on the running torque signal while the joint is still in the incipient clamp up region 16. In this circumstance, the calculated torque rate TR will be much too low.

The outputs 84, 90 of the comparators 78, 80 are connected to a Exclusive Or gate 94. As will be apparent to those skilled in the art, the gate 94 delivers a signal on an output 96 when the comparator output 84 is energized and the signal ceases when the output 90 is energized. Accordingly, a signal appears on the gate output 96 which is representative of the torque interval from $T_1$ to $T_2$.

The output 96 is connected to an And gate 98 having the angle lead 44 as its other input. The gate 98 accordingly delivers a series of angle pulses on its output 100 so long as a signal exists on the gate output 96. It will be evident that angle pulses appear on the angle lead 44 whenever the tool 26 is rotating. Since the gate 98 delivers a signal on the lead 96 and the signal ceases when the signal on the lead 96 stops, there appears in the gate output 100 a series of angle pulses which is representative of $a_k$ as shown in FIG. 2.

Because the signals appearing on the gate output 100 are digital in nature, i.e. constitute a series of pulses, it is desirable to count the pulses to determine the magnitude of the angle $a_k$. Accordingly, the output 100 is connected to a counter 102 having an output 104 connected to a digital to analog converter 106 which delivers an analog signal on its output 108 which is representative of $a_k$.

The converter output 108 is connected to a divider 110 having an input 112 carrying a signal representative of the constant C from equation (5) or (9). C is, of course, the ratio of the final desired tension value $F_D$ and the tension rate FR multiplied by the torque differential $T_2-T_1$. The divider output 114 carries a signal representative of $T_D$ in accordance with equation (5).

In order to refine the value for $T_D$, the output 114 is connected to an adder 116 having an input 118 carrying a signal representative of offset torque $T_{os}$. Accordingly, the output 122 of the adder 116 carries a signal representative of $T_{D1}$ in accordance with $$T_{D1} = \frac{F_D(T_2 - T_1)}{FR} \times a_k^{-1} + T_{os}. \tag{11}$$

which is similar to equation (9) except that no provision has been made for the torque component of overrun $T_{or}$. It will be appreciated that an accommodation of overrun may be made by placing a subtractor in the output 122 to deduct the torque value corresponding to an average amount of overrun, expressed in torque units, to reach the result of equation (9).

An accommodation for prevailing torque $T_{pv}$ may be made in one of two ways. As illustrated in FIG. 3, the comparator 124 has, as one input, the lead 76 which carries a signal representative of $T-T_{pv}$. Accordingly, the comparison made is $$T - T_{pv} = \frac{F_D(T_2 - T_1)}{FR} \times a_k^{-1} + T_{os} \tag{12}$$

which transposes to $$T = \frac{F_D(T_2 - T_1)}{FR} \times a_k^{-1} + T_{os} + T_{pv} \tag{13}$$

which, of course, is basically equation (9). In this version, the output 122 is connected to a comparator 124 having an input connected to the lead 76 which carries a signal representative of $T-T_{pv}$. When the value of $T-T_{pv}$ equals $T_{D1}$, the comparator 124 conducts along its output 126 through the logic 72 to deliver a shut off signal through the lead 46 to the tool solenoid 34 which terminates tightening of the joint.

It will accordingly be seen that termination of tightening occurs in response to a comparasion of $T_{D1}$ with $T-T_{pv}$. It will be appreciated, of course, that this determination is the same as if a value for $T_{pv}$ were added to the signal on the lead 122 and a comparison made between running torque T and the signal on the lead 122 after the value of $T_{pv}$ is added.

It will thus be seen that the embodiment of FIG. 3 uses predetermined values for $T_1$ and $T_2$, measures the spacing $a_k$ therebetween, and calculates a final shut off parameter in response to these three parameters.

One of the surprising aspects of this invention is that the tension scatter observed compares so favorably with the much more elaborate and sophisticated digital approach disclosed in Application Ser. No. 912,151. A table appears in Application Ser. No. 912,151 showing tension scatter as follows:

| Lube Condition | Tension and Torque Scatter One Standard Diviation | | |
|---|---|---|---|
| | Tension Scatter, % | | Torque Scatter at 6300#, % |
| | LRM | T-O-T-N | |
| dry | 2.2 | 6.4 | 18.5 |
| oiled | 2.4 | 5.0 | 13.8 |
| mixed | 2.6 | 8.2 | 29.9 |

These values have been adjusted for load washer error of 1.8%. The LRM values shown in FIG. 1 are results from the sophisticated approach of Ser. No. 912,151. The tension scatter in fasteners tightened in accordance with this invention are about 1-2% greater, i.e. in the range of about 3.2-4.6%, than that from the more sophisticated technique.

PREDETERMINING $T_1$ AND $\alpha_k$

Referring to FIG. 2, the values of $T_1$ and $\alpha_k$ are predetermined in accordance with this embodiment of the invention and, accordingly, the only actual measuring requirement is the value for $T_2$.

Referring to FIG. 4, there is illustrated another embodiment of a tightening system 128 in accordance with this invention. The system 128 includes a wrench 130 including a motor 132, an output drive shaft 134 and a driver bit 136. The drive shaft 134 is driven by the motor 132 to apply torque and impart rotation to a fastener engaged by the driver bit 136. The wrench 130 is typically air powered with the flow of pressurized air being controlled by a suitable electrically energized motor or solenoid 138. As in the embodiment of FIG. 3, the wrench 130 may be of the type disclosed in the application of George D. Hall, Ser. No. 088,327, filed Oct. 25, 1979, entitled PORTABLE FASTENING TOOL WITH MANUAL TURN ON AND AUTOMATIC SHUT OFF.

The wrench 130 includes a torque sensor or transducer 140 for generating a varying signal representative of the instantaneous torque being applied to the fastener. Mounted on the wrench 130 and preferably in association with the shaft of the motor 132 is an angle transducer or encoder 142 that produces signals representative of the incremental angular displacement or rotation of the fastener.

As shown in FIG. 4, the tightening system 128 also includes a control circuit 144 connected to the tool 130 by an electrical lead 146 extending to the torque transducer 140, an electrical lead 148 extending to the output of the angle encoder 142 and an electrical lead 150 extending to the solenoid 138 for stopping the tool 130 in response to the determinations made in the circuit 144. The circuit 144 includes a cycle start switch 152 which is preferably located inside the tool 130 in association with the operator's handle 154 as disclosed more fully in the aforementioned application of George D. Hall. The cycle start switch 154 also provides a reset feature so that the switch 154 opens at the end of a tightening cycle and the memory components of the circuit 144 are cleared.

As illustrated, the circuit 144 comprises two subcircuits, a circuit 156 for accommodating prevailing torque $T_{pv}$ and a main calculating circuit 158. The prevailing torque circuit 156 comprises a timer 160 connected to the cycle start switch 152 by a lead 162. At the end of a short predetermined interval, the timer 160 conducts along its output 162 to deliver a signal at the end of the predetermined interval to a sample and hold component 164 which has its other input connected to the torque lead 146. The signal on the torque lead 146 is, of course, prevailing torque $T_{pv}$. This value for prevailing torque $T_{pv}$ is delivered to and stored in a sample and hold component 164. The component 164 includes an output 166 carrying a signal which is representative of $T_{pv}$ as will be more fully explained hereinafter.

The output 166 is connected to one input of a subtractor 167 having another input connected to the torque lead 146. The output 168 of the subtractor carries a signal representative of $T_a$ which is running torque T minus prevailing torque $T_{pv}$.

The main calculating circuit 158 includes a comparator 169 connected to the output 168 and including an input 170 having thereon a signal representative of the predetermined value of $T_1$. When the value of $T_a$ exceeds $T_1$, the comparator 169 delivers a signal on its output 172 which is connected to a counter 174 having its input connected to the angle lead 148. The output 176 of the counter 174 is connected to a digital to analog converter 178 which delivers along its output an analog signal representative of the angle traversed beyond $T_1$. The output 180 of the converter 178 is connected to a comparator 182 which includes another input 184 having a signal thereon representative of the fixed or predetermined angle thereon representative of the fixed or predetermined angle increment $\alpha_k$. The comparator 182 accordingly delivers a signal along its output 186 when the measured angle beyond $T_1$ equals the predetermined angle interval $\alpha_k$.

Connected to the comparator output 186 is a sample and hold component 188 having an input connected to the subtractor output 168. When signals appear on both of the leads 168, 186, the component 188 conducts along its output 190 to provide a signal representative of the torque value $T_2$. The output 190 is connected to a subtractor 192 having an input 194 carrying a signal representative of the predetermined value $T_1$. The output 196 of the subtractor 192 accordingly carries a signal representative of the value of $(T_2-T_1)$ which is of considerable value in completing the calculations of equation (7).

The output 196 of the subtractor 192 is connected to a multiplier 198 having an input 200 carrying a signal representative of A in equation (7) which is, of course, the ratio of desired final tension $F_D$ to the tension rate FR divided by the constant angle increment $\alpha_k$. The output 202 of the multiplier 198 accordingly carries a signal representative of $T_D$ from equation (7).

The output 202 is connected to an adder 204 having one of its inputs connected to the lead 166 from the sample and hold component 164 and having the other of its inputs 206 carrying a signal representative of offset torque $T_{os}$. The output 208 of the adder 204 accordingly carries a signal representative of $T_{D1}$ as shown in $$T_{D1} = A(T_2 - B) + T_{os} \quad (14)$$

which is similar to equation (10) except that no provision has been made for the torque component of overrun $T_{or}$. It will be appreciated that an accommodation of overrun may be made by placing a subtractor in the output 208 to deduct the torque value corresponding to an average overrun, measured in torque units, to reach the result of equation (10).

In either event, the output 208 is connected to a comparator 210 having an input connected to the output 168. When the value of $T_a$ equals $T_{D1}$, the comparator 210 conducts along its output 212 through the logic 214 to deliver a shut off signal through the lead 150 to the tool solenoid 138 which terminates tightening of the joint.

An accommodation for prevailing torque $T_{pv}$ may be made as illustrated in FIG. 4 where the comparator 210 has, as one input, the lead 168 which carries a signal representative of $T - T_{pv}$. Accordingly, the comparison made is $$T - T_{pv} = \frac{F_D}{FR(\alpha_k)}(T_2 - T_1) \tag{15}$$

which transposes to $$T = \frac{F_D}{FR(\alpha_k)}(T_2 - T_1) + T_{pv} \tag{16}$$

which, of course, is basically equation (6).

The logic 124 is preferably identical to the logic 72 and basically comprises a set-reset flip flop as will be recognized by those skilled in the art. The logic 214 includes a signal inverter 216 in a lead 218 connected to the cycle start switch 152.

The logic 214 also includes a pair of NAN gates 220, 222 each having an output 220, 222 which is cross-connected to one of the inputs of the other gate 222, 220. The input 228 of the gate 220 is connected to the inverter 216 while the input 230 of the gate 222 is connected to the comparator output 212 in the embodiment of FIG. 4 or to the comparator outputs 70, 126 in the embodiment of FIG. 3. The output 224 of the gate 220 is connected to a driver transistor 232 and to the solenoid lead 150.

At the start of the tightening cycle, closing of the cycle start switch 152 delivers a signal through the solenoid lead 150 to start the tool 130. When the torque comparator 210 flips, designating that the running torque T on the torque lead 146 is equal to the signal on the lead 208, the logic 214 delivers a signal through the solenoid lead 150 to stop the tool 130. When the operator releases the handle 154, the cycle switch 152 opens thereby resetting the logic 124.

In the embodiment of FIG. 3, the same sequence of events occurs when the signal on the lead 126 indicates that the adjusted running torque $T_a$ equals the calculated torque shut off parameter $T_{D1}$. Basically the same sequence of events occurs when the prevailing torque comparator 66 determines that the prevailing torque $T_{pv}$ experienced by any particular fastener exceeds the prevailing torque limit.

It will be seen that the embodiment of FIG. 4 uses predetermined values for $T_1$ and $\alpha_k$, measures the value of $T_2$ appearing at the predetermined spacing $\alpha_k$ and calculates a shut off parameter in response to those three parameters.

It will be seen that the embodiments of FIGS. 3 and 4 act to determine, while tightening below the yield point of any component that can be correlated with stress, a tightening of shut off parameter which varies from joint to joint for terminating tightening at or near a final desired tension value $F_D$.

It will be appreciated that the embodiment of FIG. 4 differs from the embodiment of FIG. 3 other than is dictated by the requirements of the different techniques for determining the torque rate TR. Specifically, the embodiment of FIG. 4 does not contain a shut off for prevailing torque $T_{pv}$ when prevailing torque exceeds a predetermined maximum. It will be appreciated, of course, that the embodiment of FIG. 4 could also be provided with a prevailing torque shut off if desired.

It has been assumed for purposes of discussion that the torque component of overrun $T_{or}$ would be determined empirically in the laboratory as an average value for the fasteners being tightened and be used as simply a deduction from $T_{D1}$ to provide a more refined shut off parameter. It will be appreciated, of course, that a more refined determination of overrun may be predicted during the tightening of each fastener. This technique is broadly disclosed in application Ser. No. 912,151. Such a value for $T_{or}$ determined during the tightening of each fastener may be deducted from $T_{D1}$ as will be apparent to those skilled in the art.

Although the invention has been described in its preferred form with a certain degree of particularity, it is understood that the disclosure of the preferred embodiments has been made only by way of example and numerous changes in the details of construction, combination and arrangement of parts, and mode of operation may be resorted to without departing from the spirit and scope of the invention as hereinafter claimed. It is intended that the patent shall cover, by suitable expression in the appended claims, whatever features of patentable novelty exists in the invention disclosed.

I claim:

1. Apparatus for tightening a threaded fastener, comprising
   a powered tool for imparting input characteristics to the fastener;
   means for sensing the input characteristics and generating signals representative thereof;
   means responsive to the generated signals and to a ratio of a final desired tension value in the fastener and a tension rate of the fastener for determining a final shut off parameter; and
   means for terminating operation of the tool in response to the final shut off parameter.

2. The apparatus of claim 1 wherein the sensing means comprises means for sensing torque applied to the fastener and means for sensing a function of the angle of rotation of the fastener.

3. The apparatus of claim 2 wherein the determining means comprises means responsive to the generated signals for calculating the final shut off parameter from the ratio and three parameters comprising two torque values and the spacing between the two torque values.

4. The apparatus of claim 3 wherein the determining means comprises means for predetermining, before tightening, two of the three parameters and means for determining, during tightening, the third parameter.

5. The apparatus of claim 4 wherein the predetermining means comprises means for inputting the two torque values and the third parameter sensing means comprises means responsive to the two inputted torque values and operative on the signal from the angle function sensing means for measuring the spacing between the two torque values.

6. The apparatus of claim 5 wherein the first torque value is lower than the second torque value and the third parameter determining means comprises means responsive to the appearance of a torque sensing equivalent to the second torque value for measuring the spacing between the first and second torque values.

7. The apparatus of claim 6 wherein the angle function sensing means comprises means for sensing the angle of rotation of the fastener.

8. The apparatus of claim 4 wherein the predetermining means comprises means for inputting a first of the torque values and the spacing between the two torque values and the third parameter determining means comprises means responsive to the two inputted values and operative on the signal from the torque sensing means for measuring a second of the torque values at the predetermined spacing from the first torque value.

9. The apparatus of claim 1 wherein the sensing means comprises means for sensing torque applied to the fastener and further comprising means for determining the prevailing torque applied to the fastener during a region of no fastener stress and wherein the final shut off parameter determining means comprises means responsive to the generated signals, to a ratio of the final desired tension value in the fastener and the tension rate of the fastener and the prevailing torque for determining the final shut off parameter.

10. The apparatus of claim 1 wherein the sensing means comprises means for sensing the torque applied to the fastener and further comprising means for determining the prevailing torque applied to the fastener during a region of no fastener stress and wherein the terminating means comprises means for terminating operation of the tool in response to a fraction of the final shut off parameter and prevailing torque.

11. Apparatus for tightening a joint including a threaded fastener, comprising
a powered tool for imparting torque and rotation to the fastener including means for sensing a function of torque imparted to the fastener and generating a signal representative thereof and means for sensing a function of rotation of the fastener and generating a signal representative thereof;
a control circuit for determining, while tightening below the yield point of any joint component that can be correlated with stress in the fastener, a final shut off parameter variable from joint to joint in response to three parameters sensed by the sensing means, including
means for predetermining, before tightening, two of the three parameters; and
means for determining, during tightening, the third parameter; and
means for terminating operation of the tool in response to the final shut off parameter.

12. The apparatus of claim 11 wherein the three parameters comprise two torque values and the spacing between the two torque values.

13. The apparatus of claim 12 wherein the predetermining means comprises means for predetermining the two torque values and the determining means comprises means for determining the spacing between the two torque values.

14. The apparatus of claim 13 wherein the determining means comprises means for determining the spacing between the two torque values.

15. The apparatus of claim 14 wherein the predetermining means comprises means for inputting the two torque values and the determining means comprises means responsive to the two inputted torque values and operative in the signal from the rotation sensing means for measuring the spacing between the two torque values.

16. The apparatus of claim 15 wherein the first torque value is lower than the second torque value and the third parameter determining means comprises means responsive to the appearance of a torque sensing equivalent to the second torque value for measuring the spacing between the first and second torque values.

17. The apparatus of claim 16 wherein the rotation function sensing means comprises means for sensing the angle of rotation of the fastener.

18. The apparatus of claim 12 wherein the predetermining means comprises means for inputting a first of the torque values and the third parameter determining means comprises means responsive to the two inputted values and operative on the signal of the torque sensing means for measuring a second of the torque values at the predetermined spacing from the first torque value.

19. The apparatus of claim 11 wherein the sensing means comprises means for sensing torque applied to the fastener and further comprising means for determining the prevailing torque applied to the fastener during a region of no fastener stress and wherein the final shut off parameter determining means comprises means responsive to the generated signals, to a ratio of the final desired tension value in the fastener and the tension rate of the fastener and the prevailing torque for determining the final shut off parameter.

20. The apparatus of claim 11 wherein the sensing means comprises means for sensing the torque applied to the fastener and further comprising means for determining the prevailing torque applied to the fastener during a region of no fastener stress and wherein the terminating means comprises means for terminating operation of the tool in response to a fraction of the final shut off parameter and prevailing torque.

* * * * *

UNITED STATES PATENT AND TRADEMARK OFFICE
CERTIFICATE OF CORRECTION

PATENT NO. : 4,305,471
DATED : December 15, 1981
INVENTOR(S) : Siavash Eshghy

It is certified that error appears in the above—identified patent and that said Letters Patent is hereby corrected as shown below:

Column 5, Line 47, Equation (10), after $T_{os}$ insert --+--.

Signed and Sealed this

Fifteenth Day of February 1983

[SEAL]

Attest:

GERALD J. MOSSINGHOFF

Attesting Officer

Commissioner of Patents and Trademarks